US 9,046,349 B2

(12) United States Patent
Typpo et al.

(10) Patent No.: US 9,046,349 B2
(45) Date of Patent: Jun. 2, 2015

(54) METHOD AND DEVICE FOR CONTACTLESS DETERMINATION OF THE THICKNESS OF A WEB OF MATERIAL, INCLUDING CORRECTION OF THE ALIGNMENT ERROR

(75) Inventors: Pekka Typpo, Pearland, TX (US); Willy Knabe, Heidenheim (DE); Jörg Bröckel, Gerstetten (DE)

(73) Assignee: Voith Patent GmbH, Heidenheim (DE)

( * ) Notice: Subject to any disclaimer, the term of this patent is extended or adjusted under 35 U.S.C. 154(b) by 822 days.

(21) Appl. No.: 13/339,475

(22) Filed: Dec. 29, 2011

(65) Prior Publication Data

US 2012/0170059 A1 Jul. 5, 2012

Related U.S. Application Data

(63) Continuation of application No. PCT/EP2010/057885, filed on Jun. 7, 2010.

(60) Provisional application No. 61/222,648, filed on Jul. 2, 2009.

(51) Int. Cl.
| | |
|---|---|
| *G01N 21/84* | (2006.01) |
| *G01B 11/06* | (2006.01) |
| *D21F 7/06* | (2006.01) |
| *G01B 7/06* | (2006.01) |
| *G01B 21/08* | (2006.01) |

(52) U.S. Cl.
CPC .............. *G01B 11/0691* (2013.01); *D21F 7/06* (2013.01); *G01B 7/107* (2013.01); *G01B 21/08* (2013.01); *G01B 2210/44* (2013.01)

(58) Field of Classification Search
USPC ......... 356/429–431, 630–632, 625, 635, 637, 356/601, 614, 615, 622, 4.01, 485, 908; 250/559.01, 559.22, 559.19, 559.24, 250/559.26, 559.27, 206.2, 548; 334/229–230, 202, 225, 601, 662, 671
See application file for complete search history.

(56) References Cited

U.S. PATENT DOCUMENTS

| 5,798,836 A | 8/1998 | Shimokawa |
| 2006/0132808 A1 | 6/2006 | Jasinski et al. |
| 2009/0056156 A1 | 3/2009 | Hellstrom et al. |

FOREIGN PATENT DOCUMENTS

| EP | 1 855 082 A1 | 11/2007 |
| EP | 1 855 083 A1 | 11/2007 |
| WO | 99/44012 A1 | 9/1999 |

OTHER PUBLICATIONS

International Search Report dated Jul. 19, 2010 for International Application No. PCT/EP2010/057885 (6 pages).

*Primary Examiner* — Tri T Ton
(74) *Attorney, Agent, or Firm* — Taylor IP, P.C.

(57) ABSTRACT

A method for the contactless determination of the thickness of a web of material, for example a web of fibrous material using a sensor array including at least two optical measurement units between which the web can be guided. Each of the optical measurement units includes a measurement plate on the side facing the web. The optical measurement units, which are arranged on opposite sides of the web, are used to measure the distance of the measurement units from the web, and an evaluation unit is used to determine the thickness of the web from the determined distances between the optical measurement units and the web and the distance between the optical measurement units arranged on opposite sides of the web.

14 Claims, 2 Drawing Sheets

METHOD AND DEVICE FOR CONTACTLESS DETERMINATION OF THE THICKNESS OF A WEB OF MATERIAL, INCLUDING CORRECTION OF THE ALIGNMENT ERROR

CROSS REFERENCE TO RELATED APPLICATION

This is a continuation of PCT application No. PCT/EP2010/057885, entitled "METHOD AND APPARATUS FOR THE CONTACTLESS DETERMINATION OF THE THICKNESS OF A WEB OF MATERIAL, INCLUDING CORRECTION OF THE ALIGNMENT ERROR", filed Jun. 7, 2010, which is a continuation of the expired provisional application 61/222,648, filed Jul. 2, 2009. Both applications are incorporated herein by reference.

BACKGROUND OF THE INVENTION

1. Field of the Invention

The present invention relates to a method for contactless determination of the thickness of a web of material, for example a fibrous material web with a sensor arrangement including at least two optical measuring units between which the material web can be guided and which respectively include a measurement plate on the side facing the material web. The optical measuring units which are arranged on opposite sides of the material web are used to measure the distance of the measuring units from the material web and an evaluation unit is used to determine the thickness of the material web from the determined distances between the optical measurement units and the material web and the distance between the optical measurement units arranged on opposite sides of the material web. The fibrous web may in particular be a paper or cardboard web.

2. Description of the Related Art

Optical thickness sensors for contactless determination of the thickness of a material web, especially a fibrous web are known from publications EP 1 855 082 A1 and EP 1 855 083 A1.

In contactless measuring of paper thickness the distance between the optical measuring units, or respectively measurement plates which are arranged on opposite sides of the web is to be determined on the one hand, and on the other hand the distances between these measuring units or respectively measurement plates and the web are to be determined, whereby the distances between the 3 measuring units and the web are determined by means of an optical measurement. The optical measuring units which are arranged on opposite sides of the material web must be positioned in precisely the same optical axis in order to eliminate faulty measurements due to a paper web which is not progressing perpendicular to the optical axis.

In particular, due to the air build-up of the moving web tilting between the optical measuring units or measuring heads arranged on opposite sides of the web can occur, resulting in an erroneous thickness value of the web.

Such tilting between an upper and a lower optical measuring unit or respectively measurement plates 12, 14 caused for example by the air build-up of the moving web or respectively fibrous web 10 can be seen in FIG. 1 which illustrates a schematic depiction of a conventional device for contactless determination of the thickness, wherein only one optical sensor 16 or respectively 18 is allocated to a respective measuring unit. In a conventional device of this type tilting of the measurement plates 12, 14 and a possible offset between the upper and the lower optical measuring unit or respectively their measurement plates 12, 14 cannot be compensated. Therefore, in a conventional device of this type with only one path of rays on a respective web, an inaccurate measurement results.

If, in addition, an offset occurs between the upper and lower sensor it would result in that an additional error occurs in measuring the material thickness. An offset may be caused by a misalignment between upper and lower sensor carriage or through tilting of the sensing heads.

What is needed in the art is an improved method as well as an improved device, with which faulty measurements are appropriately compensated and with which a more precise measurement is achieved.

SUMMARY OF THE INVENTION

The present invention provides a method wherein multiple optical sensors which are disposed at a distance from each other are associated with the optical measurement units arranged on opposite sides of the web, and in that an evaluation unit is used to make a correction to the web thickness based on the measured values obtained through the optical sensors. For this purpose the angles of inclination of the measurement plates relative to the web obtained through the optical sensors are determined by the evaluation unit. The determined angle of inclination of the measurement plates relative to the web is then utilized through the evaluation unit to correct the web thickness value.

Based on this development, possible tilting of the measurement plates can now also be compensated for during determination of the web thickness. Optimization of the correction of the web thickness value is achieved by selecting as great as possible distances between the optical sensors of a respective optical measuring unit. The optical sensors of a respective optical measuring unit can in particular be built into the appropriate measurement plates. For example, at least three optical sensors which are disposed at a distance from each other are allocated respectively to the optical measuring units which are arranged on opposite sides of the web.

According to a first embodiment of the inventive method respectively only three optical sensors which are arranged at a distance from each other are allocated respectively to the optical measuring units which are arranged on opposite sides of the web, so that at any time a three-point measurement is possible. The distance between the optical measuring units which are arranged on opposite sides of the web is, for example, determined magnetically.

For further improved correction of the web thickness value the offset between the measurement plates which are arranged on opposite sides of the web is determined through an xy-measuring unit according to the invention. The offset may be determined by an optical xy-measuring unit consisting of an optical 2*2 detector in one of the measurement plates, and a light source in the opposite measurement plate. The evaluation unit can hereby be provided with an appropriate algorithm through which the angle of inclination and the offset can be determined and the signal of the respective optical measuring unit can be accordingly corrected.

Between each measurement plate allocated to a respective optical measuring unit and the web an air cushion is advantageously created in order to keep the measuring units at a distance from the web.

The inventive device distinguishes itself in that optical measuring units which are arranged on opposite sides of the web each include a multitude of optical sensors which are arranged at a distance from each other and that the evaluation unit is designed to determine the angle of inclination of the measurement plates relative to the web based on the measured values obtained through the optical sensors. Moreover, the evaluation unit is designed to utilize the determined angle of inclination relative to the web for correction of the web thickness value.

To further improve the level of precision an xy-measuring unit is provided which determines the offset between the measurement plates which are arranged on opposite sides of the web. The xy-measuring unit, for example, operates optically and consists of an optical 2*2 detector in one of the measurement plates, and a light source in the opposite measurement plate.

The measurement accuracy is clearly increased with the inventive solution. In particular a measurement with three paths of rays on each web side and, for example an optical trigger, can occur in order to determine the offset. Pin-diodes with Lambert characteristic may for example be utilized. With the three paths of rays always provided on each web side a tilt can additionally also be compensated. The division of the paths of rays in x- and y-direction may vary. One light source for all paths of rays on a respective web side is feasible.

Moreover, a respective optical sensor may in particular be designed as described in EP 1 855 082 A1 or EP 1 855 083 A1. An optical sensor with a device to determine the distance to an object is known for example from EP 1 855 082 A1, whereby at least one lens arrangement is provided in order to focus light from a light source, such as a laser light source onto the object and to collect light reflected and scattered from the object, whereby an aperture element with a circular aperture is provided in order to form a circular light beam from the reflected and scattered light, and a detector system structured and arranged to receive the circular light beam, wherein the detector system is sensitive to the light beam diameter, whereby determination of the distance to the object is based upon signals from the detector system. An analyzer, allocated in particular to the detector system can be designed for determination of the thickness of the object. Hereby a lens arrangement can be provided on both sides of the object and the lens arrangements provided on different sides may feature a defined distance from each other. The thickness of the object may in this case be determined in particular in that the respectively defined distances between lens arrangements provided on both sides of the object are added to the object and the thus obtained sum is subtracted from the defined or respectively determined distance between the lens arrangements.

EP 1 855 083 A1 describes a comparable optical sensor with which a light source of low coherence is used which can in particular include a super-luminescence diode. An optical window may be provided between a respective lens arrangement and the object.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
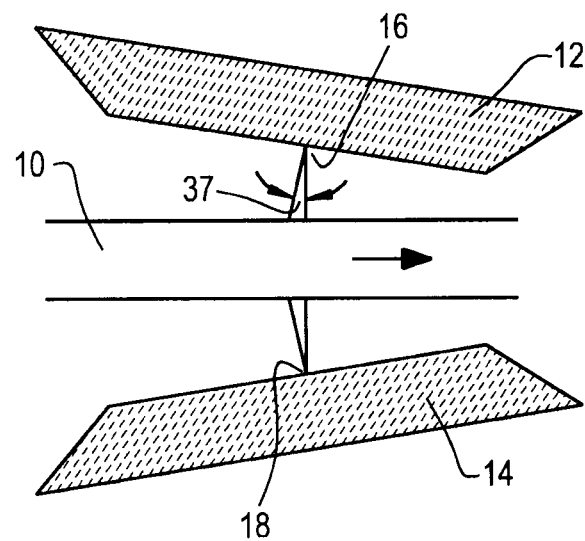
FIG. 1 is a schematic partial view of a conventional device for contactless determination of the thickness.
Figure 2:
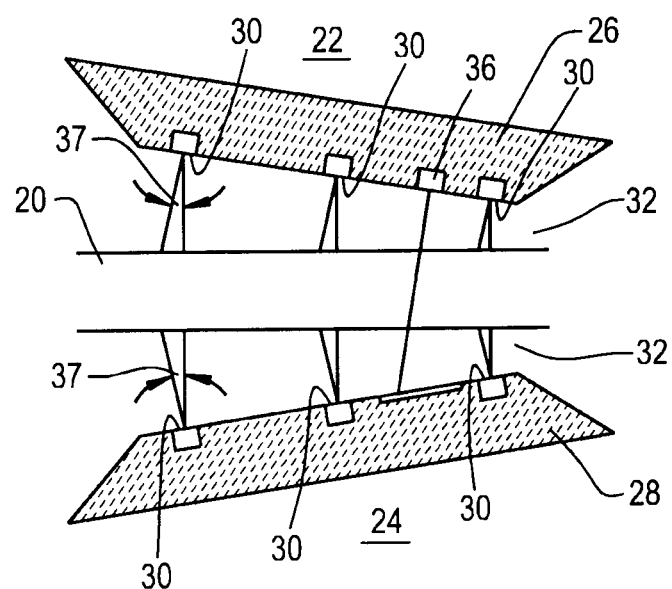
FIG. 2 is a schematic partial view of an embodiment of the inventive device for contactless determination of the thickness of a web.

Referring now to the drawings, and more particularly to FIG. 2, there is shown an embodiment of an inventive device for contactless determination of the thickness of web 20 which may for example be in the embodiment of a fibrous material web, paper or cardboard web. The device includes a sensor arrangement having at least two optical measuring units 22, 24 between which web 20 can be guided and which respectively include measurement plate 26, 28 on the side facing web 20.

Hereby optical measuring units 22, 24 which are arranged on opposite sides of web 20 are used to measure their respective distance to material web 20. An evaluation unit determines the thickness of web 20 from the determined distances between optical measuring units 22, 24 and material web 20, as well as from the distance between these optical measuring units 22, 24 which are arranged on opposite sides of the web. Optical measuring units 22, 24 which arranged on opposite sides of web 20 respectively include multiple optical sensors 30 disposed at a distance from each other. Hereby optical measuring units 22, 24 which are arranged on opposite sides of web 20 may include at least three optical sensors 30 respectively which are disposed at a distance from each other.

In the current embodiment, optical measuring units 22, 24 which are arranged on opposite sides of web 20 respectively include only three sensors 30 which are disposed at a distance from each other.

In addition, a device may be provided to magnetically determine the distance between optical measuring units 22, 24 or respectively measurement plates 26, 28 which are arranged on opposite sides of web 20. These may for example be 3 magnetic sensors which are respectively allocated to one of the three optical sensors.

A device is also advantageously provided to create air cushion 32 between each measurement plate 26, 28 which is allocated to a respective optical measuring unit 22, 24 and web 20 in order to thereby keep measuring units 22, 24 at a distance from web 20.

Figure 3:
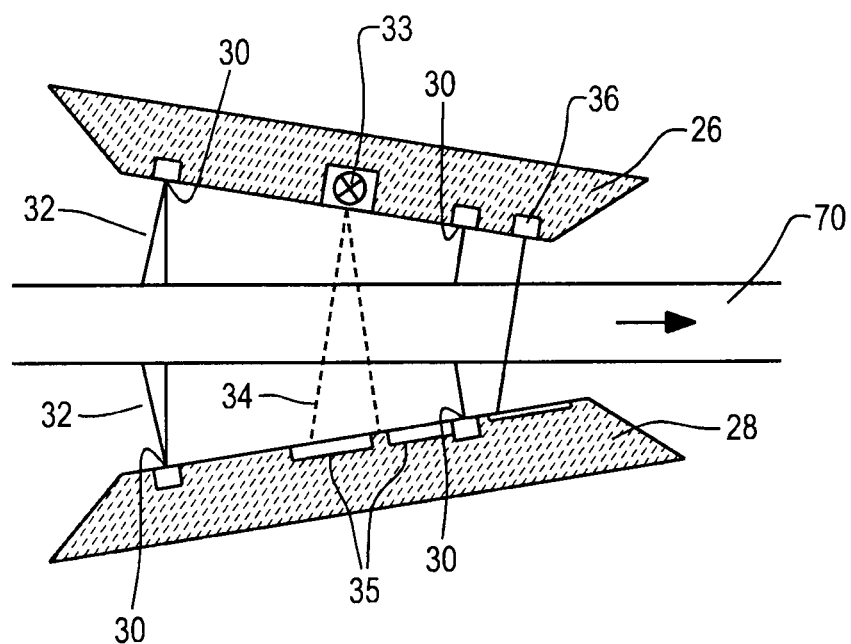
FIG. 3 is a schematic partial view of a second embodiment of the inventive device.

Referring now to FIG. 3, there is shown an embodiment of the present invention which additionally includes xy-measuring unit consisting of light source 33 in the upper measurement plate, whose beam 34 targets 2×2 detector 35, thereby permitting an indication of the offset of upper measurement plate relative to lower measurement plate 26, 28. The light source must be selected so that the light beam 34 can penetrate the web and cause a measurable signal on the detector surface.

The evaluation unit is hereby designed to determine also the angle of inclination of measurement plates 26, 28 relative to web 20 based on the measured values obtained by optical sensors 30 and in the case of xy-measuring unit to also determine the offset which is determined through the xy-measuring unit, between optical measuring units 22, 24 or respectively their measurement plates 26, 28 which are arranged on opposite sides of web 20.

The evaluation unit is designed in particular to utilize the determined angle of inclination of measurement plates 26, 28 relative to web 20 and/or the determined offset between optical measuring units 22, 24 or respectively their measurement plates 26, 28 which are arranged on opposite sides of web 20 for correction of the web thickness value.

As already mentioned, optical sensors 30 may moreover be designed as described in EP 1 855 082 A1 and EP 1 855 083 A1.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION

10 Web
12 Measurement plate
14 Measurement plate
16 Optical sensor
18 Optical sensor
20 Web
22 Optical measuring unit
24 Optical measuring unit
26 Measurement plate
28 Measurement plate
30 Optical sensor
32 Air cushion
33 Light source
34 Light beam
35 2×2 detector
36 Magnetic sensor
37 Angle of inclination

What is claimed is:

1. A method for contactless determination of a thickness of a fibrous material web, the method comprising the steps of:
    guiding the fibrous material web between at least two optical measuring units of a sensor arrangement, said at least two optical measuring units being arranged on opposite sides of the fibrous material web and each of said at least two optical measuring units including a measurement plate on a side facing the fibrous material web;
    determining a distance from each of said at least two optical measuring units from the fibrous material web;
    using an evaluation unit to determine the thickness of the fibrous material web from said distances between said at least two optical measuring units and the fibrous material web and a distance between said at least two optical measuring units arranged on said opposite sides of the fibrous material web;
    disposing a plurality of optical sensors allocated to said at least two optical measuring units at a distance from each other; and
    determining an angle of inclination relative to the fibrous material web of each of said measurement plates of said at least two optical measuring units by said evaluation unit and based on a plurality of values obtained through said plurality of optical sensors.

2. The method according to claim 1, further comprising the step of utilizing said angles of inclination of said measurement plates for correction of a web thickness value with said evaluation unit.

3. The method according to claim 1, wherein said plurality of optical sensors are at least three optical sensors disposed at a distance from each other and allocated respectively to said at least two optical measuring units arranged on said opposite sides of the fibrous material web.

4. The method according to claim 3, wherein said distance between said at least two optical measuring units arranged on said opposite sides of the fibrous material web is determined magnetically.

5. The method according to claim 4, further comprising the step of determining an offset between said measurement plates through an xy-measuring unit.

6. The method according to claim 5, wherein said offset is determined with an optical xy-measuring unit including an optical 2*2 detector in one of said measuring plates and a light source in another of said measuring plates opposite said measuring plate with said optical 2*2 detector.

7. The method according to claim 6, further comprising the step of creating an air cushion between each of said measurement plates allocated to said at least two optical measuring units in order to keep said at least two optical measuring units at a predefined distance from the fibrous material web.

8. A device for contactless determination of a thickness of a fibrous material web, the device comprising:
    a sensor arrangement including at least two optical measuring units arranged on opposite sides of the fibrous material web such that the fibrous material web is guided therebetween, said at least two optical measuring units each including a measurement plate on a side facing the fibrous material web and configured for use to measure a distance between each of said at least two optical measuring units and the fibrous material web;
    an evaluation unit for determining the thickness of the fibrous material web from said distances between each of said at least two optical measuring units and the fibrous material web and a distance between said at least two optical measurement units arranged on said opposite sides of the fibrous material web; and
    a plurality of optical sensors disposed at a distance from each other and allocated to said at least two optical measuring units arranged on said opposite sides of the fibrous material web, said plurality of optical sensors configured to obtain a plurality of measured values for use by said evaluation unit to determine angles of inclination of said measurement plates relative to the fibrous material web.

9. The device according to claim 8, wherein said evaluation unit is configured to utilize said determined angles of inclination of said measurement plates relative to the fibrous material web for correction of a web thickness value.

10. The device according to claim 8, wherein said plurality of optical sensors are at least three optical sensors allocated to said at least two optical measuring units and disposed at a distance from each other.

11. The device according to claim 10, further comprising a device for magnetically determining said distance between said at least two optical measuring units arranged on said opposite sides of the fibrous material web.

12. The device according to claim 11, further comprising an xy-measuring unit for determining an offset between said measurement plates arranged on said opposite sides of the fibrous material web.

13. The device according to claim 12, wherein said xy-measuring unit is an optical xy-measuring unit including a 2*2 detector in one of said measurement plates and a light source in an opposite of said measurement plates.

14. The device according to claim 13, further comprising a device for creating an air cushion between each of said measurement plates of said at least two optical measuring units and the fibrous material web to keep said at least two optical measuring units at a distance from the fibrous material web.

* * * * *